US009130645B2

(12) United States Patent  
Blair et al.

(10) Patent No.: US 9,130,645 B2  
(45) Date of Patent: *Sep. 8, 2015

(54) MINIMIZING BANDWIDTH IN DOWN-CONVERSION OF MULTIPLE RF CHANNELS

(71) Applicant: ESS Technology, Inc., Fremont, CA (US)

(72) Inventors: Robert Lynn Blair, Los Altos, CA (US); A. Martin Mallinson, Kelowna (CA)

(73) Assignee: ESS Technology, Inc., Fremont, CA (US)

(*) Notice: Subject to any disclaimer, the term of this patent is extended or adjusted under 35 U.S.C. 154(b) by 64 days.

This patent is subject to a terminal disclaimer.

(21) Appl. No.: 14/022,155

(22) Filed: Sep. 9, 2013

(65) Prior Publication Data

US 2014/0073279 A1    Mar. 13, 2014

Related U.S. Application Data

(60) Provisional application No. 61/700,305, filed on Sep. 12, 2012.

(51) Int. Cl.
*H04B 1/18*    (2006.01)
*H04B 1/26*    (2006.01)
*H04B 1/00*    (2006.01)

(52) U.S. Cl.
CPC ............. *H04B 1/26* (2013.01); *H04B 1/0007* (2013.01)

(58) Field of Classification Search
USPC ........ 455/188.1, 189.1, 190.1, 313, 315, 318, 455/323, 343.1, 314; 375/152, 350
See application file for complete search history.

(56) References Cited

U.S. PATENT DOCUMENTS 6,519,304 B1 * 2/2003 Limberg .................. 375/364
8,693,972 B2 * 4/2014 Forman et al. ............. 455/313

FOREIGN PATENT DOCUMENTS

WO        02060261 A2    8/2002
WO     2006026249 A2    3/2006

* cited by examiner

*Primary Examiner* — Nguyen Vo
(74) *Attorney, Agent, or Firm* — Gard & Kaslow LLP

(57) ABSTRACT

A method and system is disclosed for simultaneously down-converting multiple selected signals, such as RF signals, into adjacent ranges in an intermediate frequency band so that the total resulting bandwidth, and thus the sampling rate required to digitize the signal, is minimized. A first signal is down-converted into a range starting at a lowest selected frequency in the IF band. The next signal is down-converted into a range higher than, but near or adjacent to, the down-converted range of the first signal, and so on. A guard band may be left between the signals if desired. In this way, the selected signals occupy the minimum bandwidth required. When the selection of signals to be down-converted is changed, the frequency ranges are dynamically adjusted so that the signals being down-converted always occupy the lowest ranges of the IF band.

10 Claims, 3 Drawing Sheets

MINIMIZING BANDWIDTH IN DOWN-CONVERSION OF MULTIPLE RF CHANNELS

This application claims priority from Provisional Application No. 61/700,305, filed Sep. 12, 2012, which is incorporated by reference herein in its entirety.

FIELD OF THE INVENTION

The present invention relates generally to radio frequency signals, and more particularly to receivers in communication systems having multiple channels of radio frequency signals.

BACKGROUND OF THE INVENTION

The radio frequency (RF) band of the electromagnetic spectrum contains frequencies from approximately 3 kilohertz (3,000 hertz, or 3 kHz) to 300 gigahertz (GHz). In many places, the use of this band is regulated by the government. For example, in the United States, the broadcast television system is disseminated via radio transmissions on designated channels in the band from 54 megahertz (MHz) to 890 MHz, so that separate modulated frequencies are used to carry different TV shows concurrently in the allocated spectrum. There are two radio frequencies at which satellites broadcast signals in the Global Positioning System (GPS); L1 signals are broadcast at 1.57542 GHz, and L2 signals at 1.2276 GHz. Signals such as these are typically modulated signals that each contain a selected channel of data; the frequencies carrying such signals are typically referred to as "carrier frequencies."

Some radio receivers, such as super-heterodyne receivers, operate by converting a signal considered to be a "high" RF signal to a signal of a lower frequency, often referred to as an intermediate frequency (IF) by mixing the RF signal with a mixing signal of a different frequency, to allow for more convenient amplification and selection of the desired channel (and digitization as discussed below). The difference between the frequencies of the RF signal and the mixing signal is the frequency of the IF signal. The mixing signal is typically provided by a local oscillator in the receiver, and the combination of a local oscillator and a mixer is commonly referred to as a "down-converter."

(As used herein, a receiver that receives any signal in the RE band is a radio receiver, even if the signal is a television or GPS signal as above. Those of skill in the art will appreciate that "RF signal" is now often used to refer to a received signal that has not been down-converted, and that "IF signal" is used to refer to a down-converted signal, even though the RF band may technically cover the frequency of a down-converted IF signal.)

Signals in the television spectrum ma be down-converted in this way so that, for example, an RE signal in the 500 MHz to 506 MHz region (which is TV channel 19 in the United States) may be down-converted to an IF signal in the 41 MHz to 47 MHz region by mixing the RF signal with a mixing signal of 459 MHz (since 500 MHz–459 MHz=41 MHz). Other television signals, or the GPS signals described above, may be similarly down-converted. Amplification and selection of the channel to be received can thus occur in the IF frequencies, which are more easily operated upon than the higher RF frequencies.

In modern radio receivers, channel selection and recovery of the data in the channel is performed by converting the down-converted IF signal into the digital domain. An analog-to-digital converter (ADC) is used to transform the analog IF signal into a digital data stream after which sophisticated digital signal processing (DSP) techniques can be used to recover from noise, dropout and similar artifacts of as digital radio system. As is also known in the art, to convert an analog signal to a digital signal, an ADC must sample the analog signal at a rate at least twice as fast as the frequency of the signal itself. Thus, down-converting also allows the use of slower, and less expensive, ADCs.

In recent years, "multichannel communications systems" in which multiple distinct channels are each used to carry a separate received analog or digital data stream have become common. Such a system typically requires separate down-conversion of each channel from its original RF frequency to the IF band. This may be done, for example, by multiple instances of known down-converters as above, each including a local oscillator and mixer; two or more down-converters may be used and each may down-convert a different channel of information.

For example, a typical television set-top box may be able to simultaneously receive and process two channels by having two local oscillator-mixer combinations, each processing a different selected channel, so that one channel may be watched while the other is recorded to memory (or both may be recorded). Some set top boxes have the capability of processing more than two channels, by increasing the number of local oscillator-mixer combinations. The frequency of the local oscillators may be adjustable to allow for down-conversion of channels of different frequencies.

An alternate way to achieve such down-conversion of multiple signals from arbitrarily selected channels at RF frequencies to a common IF band is by use of down-conversion technologies that use a particular method of sampling the RF signals. U.S. Pat. No. 7,028,070 ("the '070 patent"), entitled "High Speed Filter" (as well as the continuation of the '070 patent, U.S. Pat. No. 8,001,172) describes an alternative way of implementing a down-conversion by using a series of sampling elements activated in a "round-robin" fashion. One embodiment using such round-robin sampling to down-convert multiple RF channels simultaneously may be found in U.S. patent application Ser. No. 13/668,253 ("the '253 application," now U.S. Pat. No. 8,693,972), entitled "Down-Conversion of Multiple RF Channels." The '070 patent and '253 application are both commonly owned by the assignee of the present application, and are incorporated herein by reference as though set forth in full.

Such newer technologies which inherently enable multiple down-conversion may be preferable in comparison to multiple instances of a local oscillator and mixer, due to a reduced number of elements and thus potentially lower cost, they result in the same output, i.e., output signals in the IF band that contain the selected channels. However, each down-converted signal must typically be digitized and processed separately from the others, potentially requiring multiple or more expensive components, and more power, in order to process multiple signals simultaneously. While the number of components, the space needed to house them, and their power consumption may be of little concern in a set-top box, as communication systems continue to become mobile these issues will become more important.

It would be beneficial to be able to combine multiple down-converted signals into a single output signal, and to minimize the bandwidth of that output signal, in order to minimize the cost and complexity of the components needed to further process the down-converted signals, as well as to lower the power required by those circuits.

SUMMARY OF THE INVENTION

A method and system is disclosed for simultaneously down-converting multiple signals, such as RF signals, into nearby ranges in an intermediate frequency (IF) band so that the total resulting bandwidth, and thus the sampling rate and power consumption required to digitize the signal, is minimized, and for dynamically adjusting the ranges in the IF band based upon a change in the number of channels.

One embodiment discloses a computer implemented method of down-converting signals from a first frequency band to a second frequency band, comprising: receiving in the processor a selection of a plurality of signals to be down-converted; determining by the processor a plurality of nearby frequency ranges starting at the lowest frequency of the second frequency band, each frequency range having a bandwidth corresponding to one of the plurality of signals; and down-converting by the processor each of the plurality of signals from the first frequency band to the corresponding one of the nearby frequency ranges in the second frequency band.

Another embodiment discloses a non-transitory computer readable storage medium having embodied thereon instructions for causing a computing device to execute a method of designing a filter for down-converting an input signal from a first frequency band to a second frequency band, the method comprising: receiving in the processor a selection of a plurality of signals to be down-converted; determining by the processor a plurality of nearby frequency ranges starting at the lowest frequency of the second frequency band, each frequency range having a bandwidth corresponding to one of the plurality of signals; and down-converting by the processor each of the plurality of signals from the first frequency band to the corresponding one of the nearby frequency ranges in the second frequency band.

DETAILED DESCRIPTION OF THE INVENTION

Figure 1:
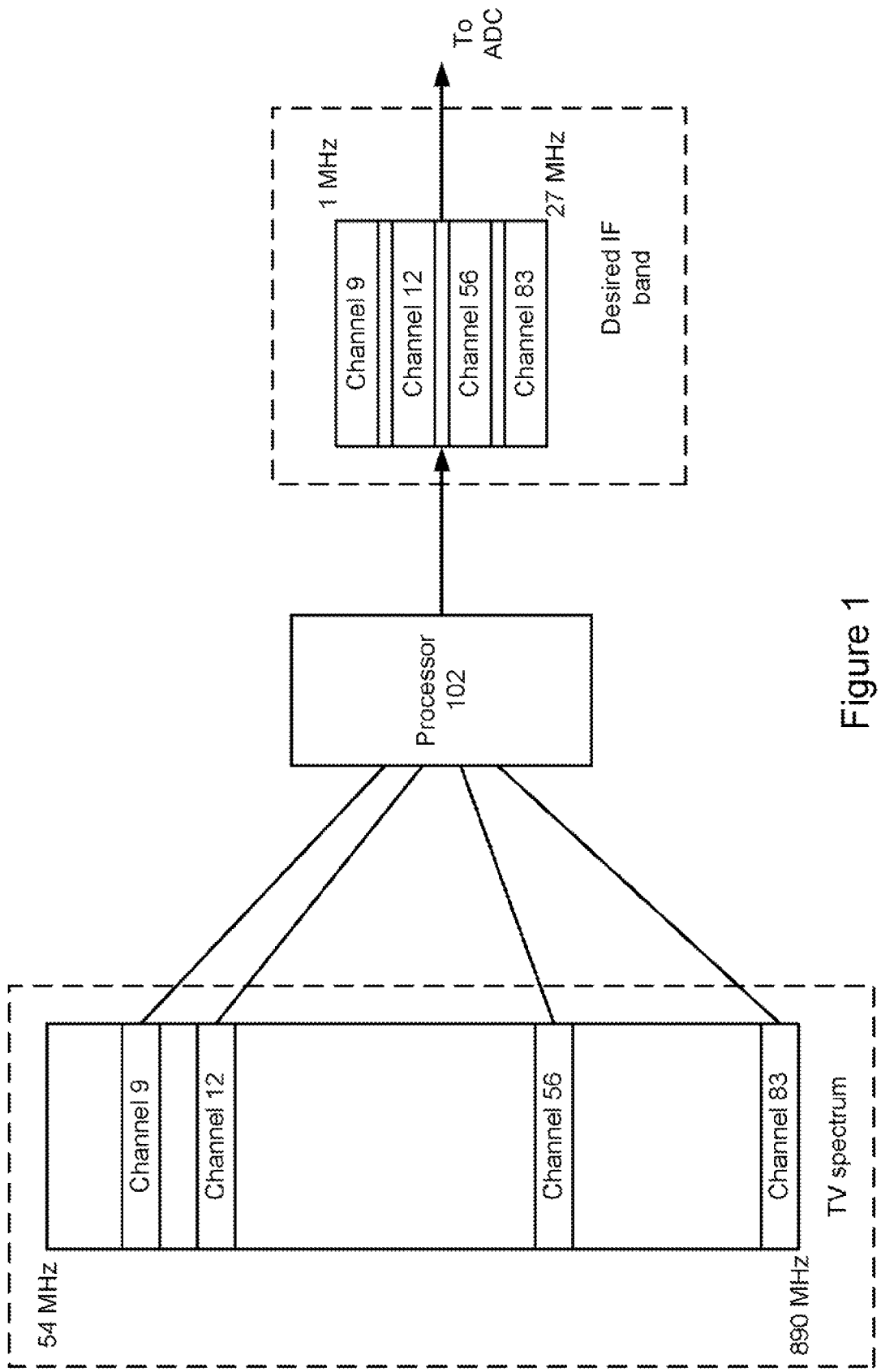
FIG. 1 is an illustration showing the down-conversion of multiple selected channels of information to nearby intermediate frequency bands in one embodiment.

Described herein is a system and method for down-converting multiple channels of information, such as RF signals, to signals in nearby portions of an IF band. The channels selected at a particular time are down-converted such that they occupy the lowest portions of the specified IF band, so that the bandwidth of the resulting IF signal is always kept to a minimum amount needed to include the down-converted channels. Having a different portion of the IF band allocated to each channel allows multiple channels to be treated as a common output signal in which each channel is separable by frequency, since each is now in a separate portion of the signal in the IF band. Such a system and method allows an ADC, which subsequently converts the resulting IF signal containing all of the channels, to run at the lowest speed which will properly digitize the signal, and thus consume the minimum possible amount of power.

In the description, above, four digital data signals being received simultaneously, whether TV, GPS or other digital data signals, could be processed with four simultaneous down-conversions. However, in the prior art, such signals are generally down-converted independently, without much regard for the treatment of the other signals. For example, an RF signal from 500 MHz to 506 MHz containing TV channel 19 might be down-converted to an IF frequency spectrum of 5 MHz to 11 MHz. The GPS L1 signal at 1.57542 GHz might be down-converted to, for example, 20 MHz, the GPS L2 signal at 12276 GHz down-converted to, for example, 35 MHz, and a 2.4 Ghz digital data signal channel could be down-converted to, for example, 90 MHz, a gap of 55 MHz from the down-converted. GPS L2 signal. In such a case, an ADC operating at 180 mega-samples per second (MS/s) (again, twice the highest frequency) is needed to properly digitize the entire IF band, thus capturing the TV, GPS and digital data signals. A similar result may occur even if all of the signals are television signals, as again the range of television signals is from 54 MHz to 890 MHz.

By dynamically down-converting signals to the lowest portions of the IF band, the described method minimizes the sampling rate required to digitize the down-converted signals. Reducing the rate at which the ADC must run in turn allows for lower power consumption by the ADC.

In one embodiment, a number of channels of information, such as RF signals, are selected to be received; in some cases the channels may be selected, for example, by a user, while in other cases they may be pre-programmed. The selected channels are down-converted to IF signals, either simultaneously or close in time. Each channel is down-converted to a separate frequency range in the IF band. The IF frequency ranges to which the Channels are down-converted are selected to be adjacent portions that occupy the lowest end of a specified IF band.

When the selection of channels is altered, again for example either by a user or by pre-programming, the currently selected channels are again down-converted to IF signals. Again, the IF frequency ranges to which the channels are down-converted are selected to be adjacent ranges at the lowest end of the specified IF band. In some cases, the dynamic selection of these ranges for each selected set of channels may cause a channel to be down-converted to a different frequency range than the frequency range to which it was previously down-converted. As a result, the bandwidth of the resulting IF signal is always kept to a minimum amount needed to include the selected channels.

Figure 2:
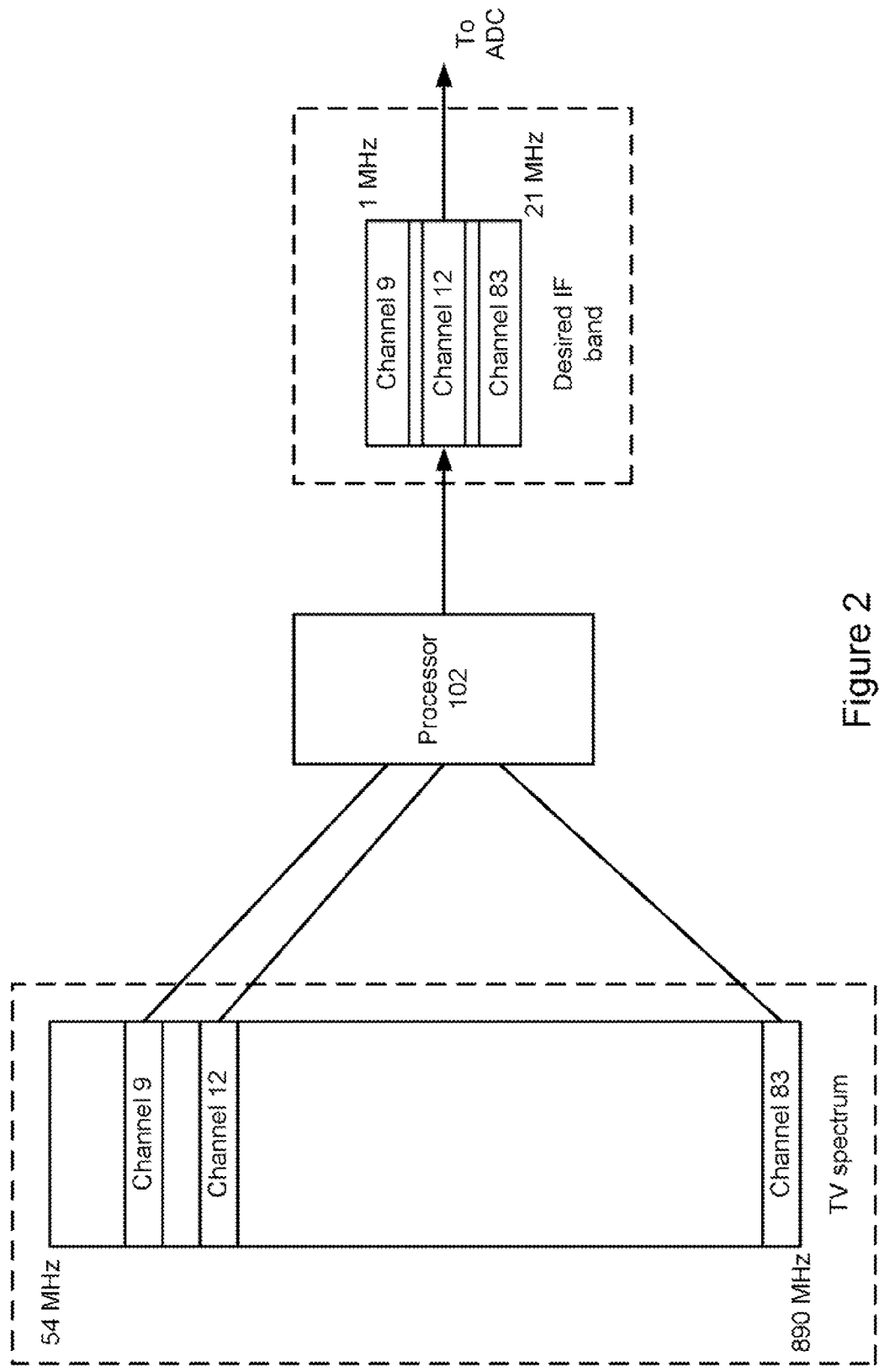
FIG. 2 is an illustration showing the down-conversion of a different number of selected channels of information to nearby intermediate frequency bands in one embodiment.

FIGS. 1 and 2 illustrate one embodiment of this down-conversion. In FIG. 1, four channels of television at RF frequencies have been selected, in this case channels 9, 12, 56 and 83. As above, in the United States each channel occupies 6 Mhz of bandwidth. The four selected channels occupy the following frequency ranges:

| Channel 9  | 186 MHz-192 MHz |
| Channel 12 | 204 MHz-210 MHz |
| Channel 56 | 722 MHz-728 MHz |
| Channel 83 | 884 MHz-890 MHz |

It may be seen that while the original bandwidth of these channels is 704 MHz (from 186 MHz to 890 MHz), the actual signals only occupy 24 MHz of that bandwidth (4 channels at 6 MHz each) with the rest of the range being occupied by other television signals. It would thus be advantageous if the resulting IF signal could be limited to a bandwidth as close to 24 MHz as is practical. (While this example uses only television channels for simplicity of presentation, the described method and system may be used with any RF signals that are to be down-converted to IF frequencies.)

This is accomplished by down-converting the four selected channels to adjacent or nearby ranges of a desired IF band. The low end of the desired IF band to be used will typically be pre-selected, for example by a system designer, by selecting the lowest frequency to be used in down-conversion. One of ordinary skill in the art will appreciate the design considerations involved in choosing such a lowest frequency to be used. In the embodiment illustrated in FIG. 1, a processor 102 is configured to down-convert the four selected channels to adjacent ranges of an IF band starting with a selected lowest frequency of 1 Mhz. (The value of 1 Mhz is selected as so that a frequency of zero is not encountered in the IF signal; one of skill in the art will appreciate that this avoids certain, processing issues.)

Thus, the first channel, here channel 9, is down-converted to a frequency range of 1 Mhz to 7 Mhz. After a 1 Mhz "guard band" which keeps the signal bands from overlapping to further insure separability of the signals, the second channel, channel 12 is down-converted to a frequency range of 8 Mhz to 14 Mhz. Continuing this pattern results in channel 56 being down-converted to 15 Mhz to 21 Mhz, and channel 83 to 22 Mhz to 28 Mhz. The range of 1 MHz to 28 MHz is now a signal which contains all four channels, and may be properly digitized by an ADC running at 56 MS/s (times the highest frequency) so that further processing may occur in the digital domain. (Guard bands may be as large as desired. However, as signal processing technology improves, guard bands are becoming less necessary and in at least some instances may be omitted if desired.)

If a system designer wishes to use a different IF band, perhaps due to the frequency range(s) of other components, the IF band to be used may again be selected, by selecting the lowest frequency to be used. Thus, rather than having the lowest usable frequency be 1 MHz as above, in another embodiment the first channel might occupy the frequency band from 10 MHz to 16 MHz. It will be apparent that doing this will result in an IF frequency range for all four down-converted channels that runs from 10 MHz to 37 Mhz, rather than the 1 MHz to 28 MHz band above, and that properly digitizing the resulting IF signal will require an ADC running at 74 MS/s rather than at 56 MS/s as above. Guard bands of different sizes may also be inserted between signals if desired.

As above, the channel signals may be down-converted to the ranges in the IF band either by conventional means or by the more modern methods described above. Processor 102 may, for example, be part of a receiver that includes a plurality of conventional local oscillator-mixer combinations as in the prior art, or a round-robin sampling circuit and associated logic as described in the references incorporated herein.

FIG. 2 illustrates a similar down-conversion, but of a different set of selected channels. Here channels 9, 1.2 and 83 are selected, and channel 56 is omitted. Channels 9 and 12 are down-converted to the frequency bands at 1 Mhz to 7 Mhz and 8 Mhz to 14 Mhz respectively as before. Now, however, channel 83 is not down-converted to the frequency band 22 Mhz to 28 Mhz, but to the lowest available frequency band, which is now the band 15 Mhz to 21 Mhz that was previously occupied by channel 56.

As a result of this down-conversion, and the change in the frequency band to which channel 83 is down-converted due to the selection of only three channels rather than four, the three selected channels occupy the range from 1 Mhz to 21 Mhz, rather than the range 22 Mhz to 28 Mhz that was previously occupied by the same channels (and the newly-omitted channel 56). The ADC is thus able to run at only twice the highest frequency of this narrower IF range, i.e., at 42 Mhz, rather than at the previously required speed of 56 MHz.

It may thus be seen that reducing the number of channels from four to three allows a similar reduction in the necessary speed of the ADC, from 56 MHz to 42 MHz. Since power consumption in the ADC is related to the speed of operation, this allows for a reduction in power consumption, which may be beneficial in some applications, such as mobile applications where power must be supplied by a battery.

Figure 3:
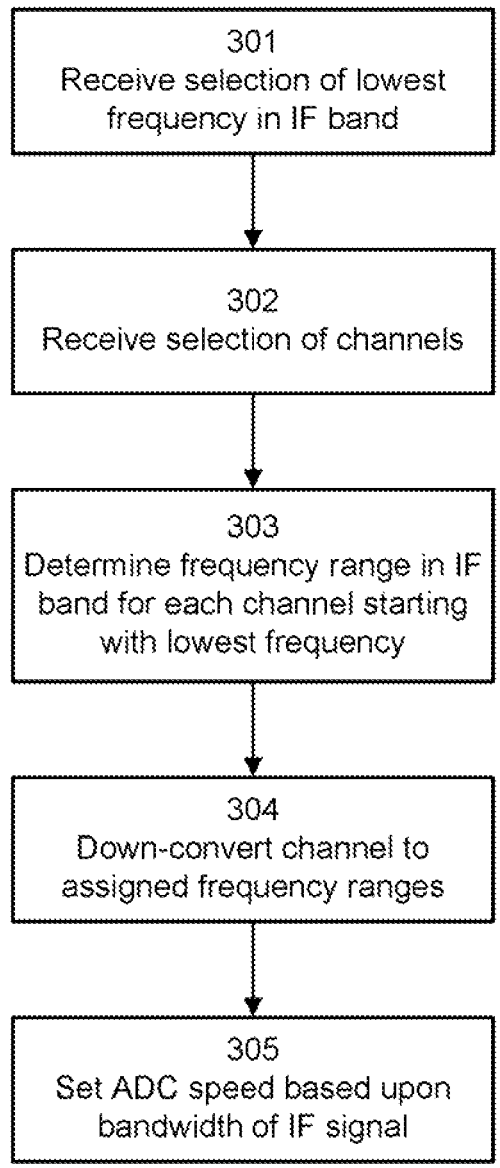
FIG. 3 is a flowchart illustrating one embodiment of a method for down-converting multiple channels of information to nearby ranges in an IF band, and dynamically adjusting the ranges in the IF band based upon a change in the number of channels.

FIG. 3 is a flowchart illustrating one embodiment of a method for simultaneously down-converting multiple channels of information to nearby ranges in an IF band, and adjusting the speed of operation of an ADC based upon the collective bandwidth of the channels.

At step 301, the lowest frequency to be used for the down-converted IF signals is selected (possibly during system design as above) and received by the down-converting system, for example as an input by processor 102.

At step 302, the channels of information to be received and down-converted are selected, again for example by a user, and the selection(s) received as an input by the system. For example, in the example described above, it may be sufficient to select television channels by number. In other embodiments, other types of selection might be used, for example by indicating that a particular radio or GPS signal is to be received, or a specific frequency band, etc.

At step 303, the frequency band in the IF band to which each channel will be down-converted is determined. In general this will be done by logic such as processor 102 assigning the first selected channel to a range that begins at the selected lowest frequency and extends for the bandwidth of the channel, then the next selected channel, etc., with allowance for a guard band in between adjacent channels if desired. Thus, in the example discussed above, the first television channel is assigned to a range starting at 1 MHz, the selected lowest frequency, and extending for 6 MHz, the width of the television signal, so that the resulting range is 1 MHz to 7 MHz, the second channel resulting in the range 8 MHz to 14 MHz, etc. This continues until all channels have been assigned a frequency range.

Signals other than television signals will of course have different bandwidths, but the method of assigning the frequency ranges is the same. Again, logic such as processor 102 may keep track of the received channels and the frequency ranges to which they are down-converted so that the information is available for later use, for example to tell the ADC the resulting total bandwidth so that the speed of the ADC may be adjusted as above, and possibly by the DSP components as well.

At step 304 the selected channels are down-converted to the determined frequency ranges. Again, an example of steps 303 and 304 is shown in FIGS. 1 and 2 as described above. In the example of FIG. 1, channel 9 is assigned to a range beginning at the selected lowest frequency of 1. MHz, channel 12 is assigned to a range beginning at a frequency above the highest frequency of the band of channel 9 (and a guard band), etc., as in step 303. The channels are then down-converted to those ranges as shown in FIG. 1, as in step 304.

At step 305, the speed of operation of the ADC is set to a speed that is sufficient to properly digitize the IF signal, based upon the bandwidth of the IF signal. As above, the minimum speed necessary is two times the highest frequency of the IF signal; this is believed to be preferable as it will result in the lowest possible power consumption by the ADC for the particular IF signal.

If no new selection of channels is received, the selected channels will continue to be down-converted to the same frequency ranges, and presumably subsequently digitized by an ADC and processed by DSP components. However, if a new selection of channels is made, again for example by a user or pre-programming, the process will return to step 302 to receive that selection, and, the process will repeat from there (assuming there is no change in the lowest frequency of the IF band). The new selection of channels will be assigned to frequency ranges in the IF band again starting with the selected lowest frequency and sequentially determining the frequency range to which each channel is to be down converted as above (step 303), the channels will be down-converted to the determined ranges (step 304), and the ADC set to the appropriate speed for the new resulting IF signal (step 305). This again will always result in the smallest possible total bandwidth that includes each of the selected channels and the selected guard bands.

As above, the down-conversion may be done either by conventional down-conversion circuits, or in the round robin fashion disclosed in the references incorporated herein. One of skill in the art will appreciate the control issues inherent in the use of conventional local oscillator-mixer circuits, and that the round robin approach is likely to be easier to implement in a processor or computer since in the round robin approach most of the functionality, other than simple sample and hold components, occurs in logic rather than the frequency based components of the conventional approach.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc. It may be possible to incorporate the described methods into hard-wired logic if desired. It should be noted that the order of the steps of the methods described herein may be altered, and still be within the scope of the disclosure.

These and other variations upon the embodiments are intended to be covered by the present disclosure, which is limited only by the appended claims.

What is claimed is:

1. A computer implemented method of concurrently down-converting channels of information from an input signal in a first frequency band to a second frequency band, comprising:
  receiving in a processor a selection of a plurality of channels in the input signal to be down-converted;
  determining by the processor a plurality of frequency ranges nearby to one another and starting at a lowest frequency of the second frequency band, each frequency range having a bandwidth corresponding to one of the plurality of channels;
  receiving in the processor a first selected transfer function and a second selected transfer function, the first selected transfer function for down-converting a first one of the plurality of channels to a first one of the plurality of frequency ranges which is the lowest frequency range in the second frequency band, and the second selected transfer function for down-converting a second one of the plurality of channels to a second one of the plurality of frequency ranges which is the next lowest frequency range in the second frequency band;
  determining by the processor a first plurality of sets of scaling factors representing the first transfer function and a second plurality of sets of scaling factors representing the second transfer function;
  receiving a sequential series of samples of the input signal from an array of sampling circuits for sampling the input signal in response to a timing signal, the array configured such that the sampling circuits create samples of the input signal in a time-delayed sequence at an interval, and wherein each individual sampling circuit operates at a rate of the interval between samples times the number of sampling circuits;
  successively multiplying in the processor each of the samples of the input signal by the first plurality of sets of scaling factors by rotating between each of the first plurality of sets of scaling factors, each multiplication resulting in a first set of interim outputs;
  successively multiplying in the processor each of the samples of the input signal by the second plurality of sets of scaling factors by rotating between each of the second plurality of sets of scaling factors, each multiplication resulting in a second set of interim outputs;
  summing in the processor the first set of interim outputs to create a first output signal in the first one of the plurality of frequency ranges in the second frequency band; and
  summing in the processor the second set of interim outputs to create a second output signal in a second one of the plurality of frequency ranges in the second frequency band.

2. The method of claim 1, further comprising:
  receiving in the processor a revised selection of the plurality of channels to be down-converted;
  dynamically adjusting the plurality of frequency ranges of the second frequency band to correspond to the revised plurality of channels; and
  receiving in the processor revised transfer functions for down-converting the revised selection of channels to the lowest frequency ranges in the second frequency band.

3. The method of claim 2, further comprising digitizing the output signals in the second frequency band with an analog-to-digital converter.

4. The method of claim 3, further comprising causing the analog-to-digital convertor to operate at a rate that is double the highest frequency of the output signals in the second frequency band after the dynamic adjustment of the frequency ranges.

5. The method of claim 2 wherein each of the plurality of adjusted frequency ranges is adjacent to another frequency range.

6. The method of claim 1, further comprising digitizing the output signals in the second frequency band with an analog-to-digital converter.

7. The method of claim 6, further comprising causing the analog-to-digital converter to operate at a rate that is double the highest frequency of the output signals in the second frequency band.

8. The method of claim 1 wherein each of the plurality of frequency ranges is adjacent to another frequency range.

9. A non-transitory computer readable storage medium having embodied thereon instructions for causing a computing device to execute a method of concurrently down-converting channels of information from an input signal in a first frequency band to a second frequency band, the method comprising:

receiving in a processor a selection of a plurality of channels to be down-converted;

determining by the processor a plurality of frequency ranges nearby to one another and starting at a lowest frequency of the second frequency band, each frequency range having a bandwidth corresponding to one of the plurality of channels;

receiving in the processor a first selected transfer function and a second selected transfer function, the first selected transfer function for down-converting a first one of the plurality of channels to a first one of the plurality of frequency ranges which is the lowest frequency range in the second frequency band, and the second selected transfer function for down-converting a second one of the plurality of channels to a second one of the plurality of frequency ranges which is the next lowest frequency range in the second frequency band;

determining by the processor a first plurality of sets of scaling factors representing the first transfer function and a second plurality of sets of scaling factors representing the second transfer function;

receiving a sequential series of samples of the input signal from an array of sampling circuits for sampling the input signal in response to a timing signal, the array configured such that the sampling circuits create samples of the input signal in a time-delayed sequence at an interval, and wherein each individual sampling circuit operates at a rate of the interval between samples times the number of sampling circuits;

successively multiplying in the processor each of the samples of the input signal by the first plurality of sets of scaling factors by rotating between each of the first plurality of sets of scaling factors, each multiplication resulting in a first set of interim outputs;

successively multiplying in the processor each of the samples of the input signal by the second plurality of sets of scaling factors by rotating between each of the second plurality of sets of scaling factors, each multiplication resulting in a second set of interim outputs;

summing in the processor the first set of interim outputs to create a first output signal in the first one of the plurality of frequency ranges in the second frequency band; and summing in the processor the second set of interim outputs to create a second output signal in a second one of the plurality of frequency ranges in the second frequency band.

10. The non-transitory computer readable storage medium of claim 9, the method further comprising:

receiving in the processor a revised selection of the plurality of signals channels to be down-converted;

dynamically adjusting the nearby frequency ranges of the second frequency band to correspond to the revised plurality of signals channels; and receiving in the processor revised transfer functions for down-converting the revised selection of channels to the lowest frequency ranges in the second frequency band.

\* \* \* \* \*